United States Patent
Seyler et al.

(10) Patent No.: US 12,366,220 B2
(45) Date of Patent: Jul. 22, 2025

(54) DE-PRESERVING A FUEL SYSTEM OF A TURBINE ENGINE

(71) Applicant: RTX Corporation, Farmington, CT (US)

(72) Inventors: Joshua Seyler, Stuart, FL (US); Lajos H. Horvath, Jupiter, FL (US); Sami Chukrallah, West Palm Beach, FL (US); Richard D. Konney, Palm City, FL (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/425,680

(22) Filed: Jan. 29, 2024

(65) Prior Publication Data
US 2024/0167444 A1    May 23, 2024

Related U.S. Application Data (62) Division of application No. 17/371,218, filed on Jul. 9, 2021, now Pat. No. 11,885,287.

(51) Int. Cl.
*F02M 37/22* (2019.01)
*B67D 7/02* (2010.01)
*F01D 19/00* (2006.01)
*F02M 7/22* (2006.01)

(52) U.S. Cl.
CPC ............... *F02M 37/22* (2013.01); *B67D 7/02* (2013.01); *F01D 19/00* (2013.01); *F02M 7/22* (2013.01)

(58) Field of Classification Search
CPC . F02M 37/22; F02M 7/22; B67D 7/02; F01D 19/00; F01D 25/002; F05D 2230/72; F05D 2260/602; F05D 2260/95; F02C 7/232
USPC .................................................. 141/1
See application file for complete search history.

(56) References Cited

U.S. PATENT DOCUMENTS

| | | | |
|---|---|---|---|
| 3,774,394 A | 11/1973 | Criffield | |
| 4,059,123 A | 11/1977 | Bartos | |
| 4,606,311 A * | 8/1986 | Reyes | F02B 77/04 134/123 |
| 4,706,636 A | 11/1987 | Davis | |
| 4,877,043 A | 10/1989 | Carmichael | |
| 4,909,207 A * | 3/1990 | Takano | F02M 65/008 510/491 |
| 5,633,457 A * | 5/1997 | Kilar | F02B 77/04 73/114.58 |
| 7,520,136 B2 | 4/2009 | Kervistin | |
| 7,805,947 B2 | 10/2010 | Moulebhar | |
| 9,739,168 B2 * | 8/2017 | Ekanayake | C11D 3/162 |
| 10,287,909 B2 | 5/2019 | Girard | |
| 2004/0194616 A1 | 10/2004 | Few | |
| 2010/0122750 A1 | 5/2010 | Erben | |
| 2013/0032215 A1 | 2/2013 | Streifinger | |
| 2016/0349762 A1* | 12/2016 | Girard | F01D 25/00 |

(Continued)

FOREIGN PATENT DOCUMENTS

WO    2008057002 A1    5/2008

*Primary Examiner* — Kenneth Rinehart
*Assistant Examiner* — Stephanie A Shrieves
(74) *Attorney, Agent, or Firm* — Getz Balich LLC (57) ABSTRACT

A method is provided for treating a fuel system of a turbine engine. During this method, a treatment system is connected to the turbine engine. Preservation fluid is drawn out of the fuel system using the treatment system.

16 Claims, 8 Drawing Sheets

(56) References Cited

U.S. PATENT DOCUMENTS

2018/0163636 A1\* 6/2018 Griffiths ................. F02C 7/222
2019/0072041 A1\* 3/2019 Cabello .................. F02C 7/232

\* cited by examiner

DE-PRESERVING A FUEL SYSTEM OF A TURBINE ENGINE

This application is a divisional of U.S. patent application Ser. No. 17/371,218 filed Jul. 9, 2021, which is hereby incorporated herein by reference in its entirety.

BACKGROUND OF THE DISCLOSURE

1. Technical Field

This disclosure relates generally to a turbine engine and, more particularly, to a preserved fuel system of the turbine engine.

2. Background Information

A turbine engine includes a fuel system for directing fuel from a fuel reservoir to one or more fuel injectors. During turbine engine operation, these fuel injectors inject the fuel into a combustion chamber for mixing with compressed air and subsequent combustion.

At an engine manufacturer following turbine engine assembly, the fuel system is typically primed with fuel and the turbine engine is subsequently tested. Following this testing, the turbine engine may be dormant (e.g., non-operational and stored) for extended periods of time during, for example, turbine engine transport from the engine manufacturer to an aircraft manufacturer and/or turbine engine storage at the aircraft manufacturer, on or off wing. Leftover fuel from turbine engine testing can pose a potential hazard during turbine engine transport and/or turbine engine storage. The leftover fuel may also degrade (e.g., form deposits within or collect moisture within) the fuel system. Therefore, prior to shipment or long term storage of the turbine engine, it is known to inject preservation fluid into the fuel system to replace the fuel. This preservation fluid is typically less combustible/volatile than the fuel or non-combustible. The preservation fluid may be less susceptible to forming deposits within the fuel system, while maintaining and preserving rubber materials such as O-rings from drying out and cracking. The preservation fluid may prevent or reduce moisture accumulating within the fuel system which may otherwise corrode the fuel system. The preservation fluid may also reduce or prevent varnishing or other contamination within the fuel system.

Following installation of the turbine engine into an aircraft, the aircraft manufacturer may prepare the turbine engine for operation. The aircraft manufacturer, for example, typically cycles the fuel system with fresh fuel to push the preservation fluid out of the fuel system through the fuel injectors and into the combustion chamber. During this cycling, the turbine engine may begin its starting sequence and at least some of the preservation fluid may be burnt and/or be discharged from the turbine engine through its exhaust. Alternatively, the cycling may be performed prior to the starting sequence and the preservation fluid may be collected from a combustor drain following injection of the preservation fluid into the combustion chamber through the fuel injectors. However, some of the preservation fluid may still coat internal components of the turbine engine and eventually be burnt or otherwise discharged during the engine starting sequence. Both preservation fluid and burnt preservation fluid can pose a potential environmental hazard. Preservation fluid may also coke at elevated temperatures thereby forming deposits on hardware within the engine.

There is a need in the art for improved methods and systems for preparing a turbine engine for operation following fuel system preservation.

SUMMARY OF THE DISCLOSURE

According to an aspect of the present disclosure, a method is provided for treating a fuel system of a turbine engine. During this method, a treatment system is connected to the turbine engine. Preservation fluid is drawn out of the fuel system using the treatment system.

According to another aspect of the present disclosure, a treatment system is provided for a fuel system of a turbine engine. The fuel system includes an injector, a fuel system interface and a flow regulator fluidly coupled between the injector and the fuel system interface. The treatment system includes a control system and a fluid system. The control system is configured to signal the flow regulator to open. The fluid system includes a fluid system interface and a pump fluidly coupled with the fluid system interface. The fluid system interface is configured to fluidly couple with the fuel system interface. The pump is configured to draw fluid out from the fuel system at the injector through the flow regulator.

According to still another aspect of the present disclosure, a treatment system is provided for a fuel system of a turbine engine. The fuel system includes a fuel system interface. The treatment system includes a fluid system. The fluid system includes a fluid system interface, a pump and a container. The fluid system interface is configured to fluidly couple with the fuel system interface. The pump is fluidly coupled to and between the fluid system interface and the container. The pump is configured to draw preservation fluid out from the fuel system. The container is configured to receive the preservation fluid drawn out of the fuel system by the pump.

The treatment system may also include a mobile housing. The fluid system may be arranged with and mounted to the mobile housing.

The method may also include priming the fuel system with fuel using the treatment system after the drawing of the preservation fluid out of the fuel system.

The method may also include injecting the preservation fluid into the fuel system using the treatment system prior to drawing of the preservation fluid out of the fuel system.

The drawing of the preservation fluid out of the fuel system may include applying suction to the fuel system using the treatment system to draw the preservation fluid out of the fuel system.

The fuel may flow in a first direction within the fuel system during operation of the turbine engine. The preservation fluid may flow in a second direction within the fuel system during the drawing of the preservation fluid out of the fuel system. The second direction may be opposite the first direction.

The method may also include directing the preservation fluid drawn out of the fuel system into a container. The treatment system may be configured as a mobile unit. The treatment system may include the container.

The drawing of the preservation fluid out of the fuel system may include applying suction to the fuel system using a pump. The treatment system may be configured as a mobile unit. The treatment system may include the pump.

The method may also include actuating a flow regulator of the fuel system to facilitate the drawing of the preservation fluid out of the fuel system.

The flow regulator may be actuated using a control system. The treatment system may be configured as a mobile unit. The treatment system may include the control system.

The preservation fluid may be drawn out of the fuel system independent of start up of the turbine engine.

The treatment system may include a mobile housing. The control system and/or the fluid system may be arranged with and/or mounted to the mobile housing.

The control system may include a wiring harness with a power input. The control system may be configured to selectively direct electrical current from power input to the flow regulator through the wiring harness.

The power input may be configured to electrically couple the control system with an outside power source.

The treatment system may also include a battery. The power input may be configured to electrically couple the control system to the battery.

The fluid system may also include a container configured to receive the fluid drawn out from the fuel system by the pump.

The pump may be a first pump, and the fluid may be preservation fluid. The fluid system may also include a second pump configured to prime the fuel system with fuel after the preservation fluid is drawn out of the fuel system by the first pump.

The fluid may be preservation fluid. The pump may also be configured to prime the fuel system with fuel after the preservation fluid is drawn out of the fuel system.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
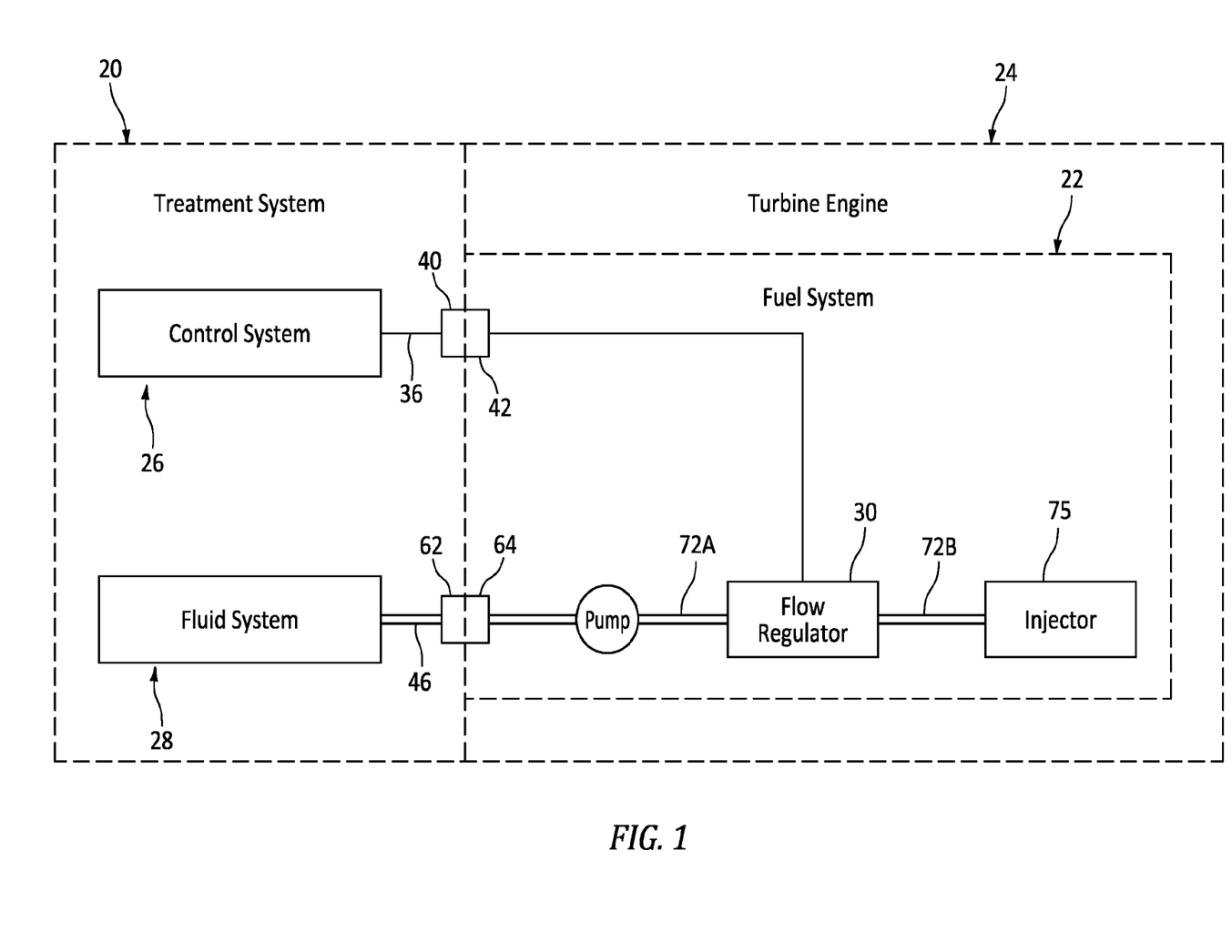
FIG. 1 is a schematic illustration of a system for treating a fuel system of a turbine engine.

FIG. 1 schematically illustrates a system 20 for treating (e.g., de-preserving) a fuel system 22 of a turbine engine 24. This treatment system 20 of FIG. 1, in particular, is configured to extract/remove preservation fluid from the fuel system 22. Examples of the preservation include, but are not limited to, MIL-PRF-6081E Grade 1010, and MIL-PRF-32033. The treatment of FIG. 1 includes a control system 26 and a fluid system 28.

The control system 26 is configured to facilitate actuation of at least one fuel system flow regulator 30 of the fuel system 22. The control system 26 of FIG. 1, for example, is configured to signal the flow regulator 30 to open during treatment system operation. Briefly, the flow regulator 30 may be configured as a fuel control valve such as, but not limited to, a main solenoid valve, a start solenoid valve or a fuel servo valve. The present disclosure, of course, is not limited to the foregoing exemplary flow regulator configurations.

Figure 2:
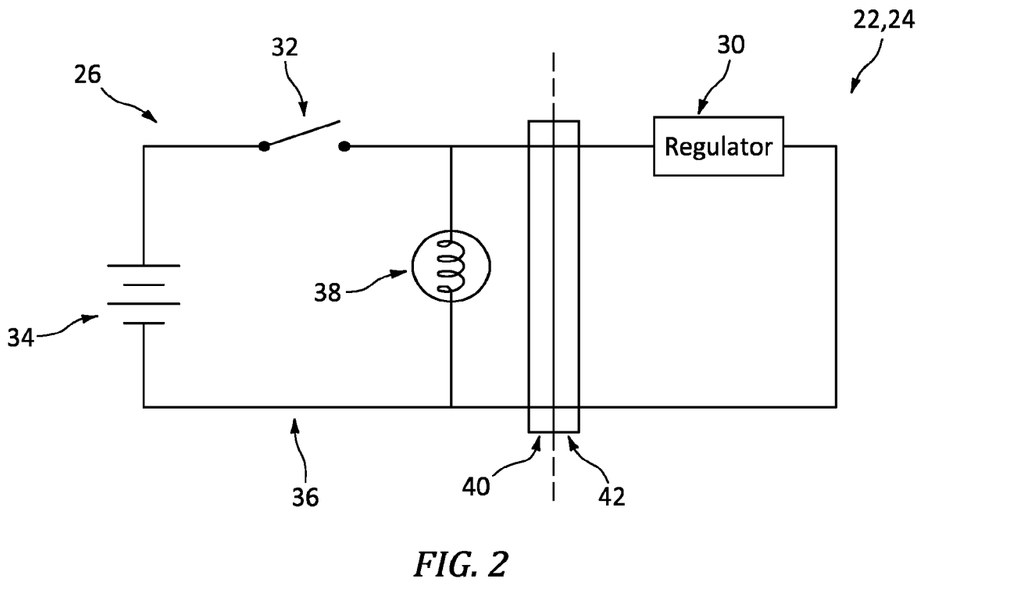
FIG. 2 is a schematic illustration of a control system for the treatment system in signal communication with the fuel system.

Referring to FIG. 2, the control system 26 includes a control system control element 32, a control system power source 34 and a control system wiring harness 36. The control system 26 may also include a control system indicator 38.

The control element 32 may be configured as a switch. This switch may be a manually triggered switch; e.g., a switch triggered by an operator. The switch may alternatively be an electronically triggered switch; e.g., a switch triggered by or configured as part of an electronic controller.

The power source 34 of FIG. 2 is configured as a battery. This battery may be electrically coupled with the wiring harness 36 through one or more power inputs; e.g., positive and negative terminals. Alternatively, the power source 34 may be configured as an external power source such as, but not limited to, an electric generator or an electric power grid, where the control system 26 may be electrically coupled to (e.g., plugged into) the external power source via, for example, a power input such as a cord.

The wiring harness 36 is configured to electrically couple the control system elements 32, 34 and 38 together. The wiring harness 36 is also configured to electrically couple the control system 26 to the turbine engine 24 and, more particularly, the fuel system 22 and its flow regulator 30. The wiring harness 36 of FIG. 2, for example, includes a harness interface 40 configured to (e.g., removably, temporarily) mate with a fuel system interface 42 of the fuel system 22. For example, the harness interface 40 may be a plug where the fuel system interface 42 is a receptacle. Alternatively, the harness interface 40 may be a receptacle where the fuel system interface 42 is a plug. Of course, various types of electrical interfaces are known in the art, and the present disclosure is not limited to any particular types or configurations thereof.

The indicator 38 is configured to provide an indication when, for example, the flow regulator 30 is actuated. The indicator 38, for example, may be configured to provide the indication when the control element 32 signals the flow regulator 30 to open. The indication may be a visual indicator and/or an audible indication. The indicator 38, for example, may be configured as an indicator light. Of course, various other types of indicators are known in the art, and the present disclosure is not limited to any particular types or configurations thereof.

Referring to FIG. 1, the fluid system 28 is configured to draw (e.g., pull, suction or otherwise direct) the preservation fluid out of the fuel system 22. The fluid system 28 may also be configured to facilitate environmentally friendly disposal of the preservation fluid.

Figure 3:
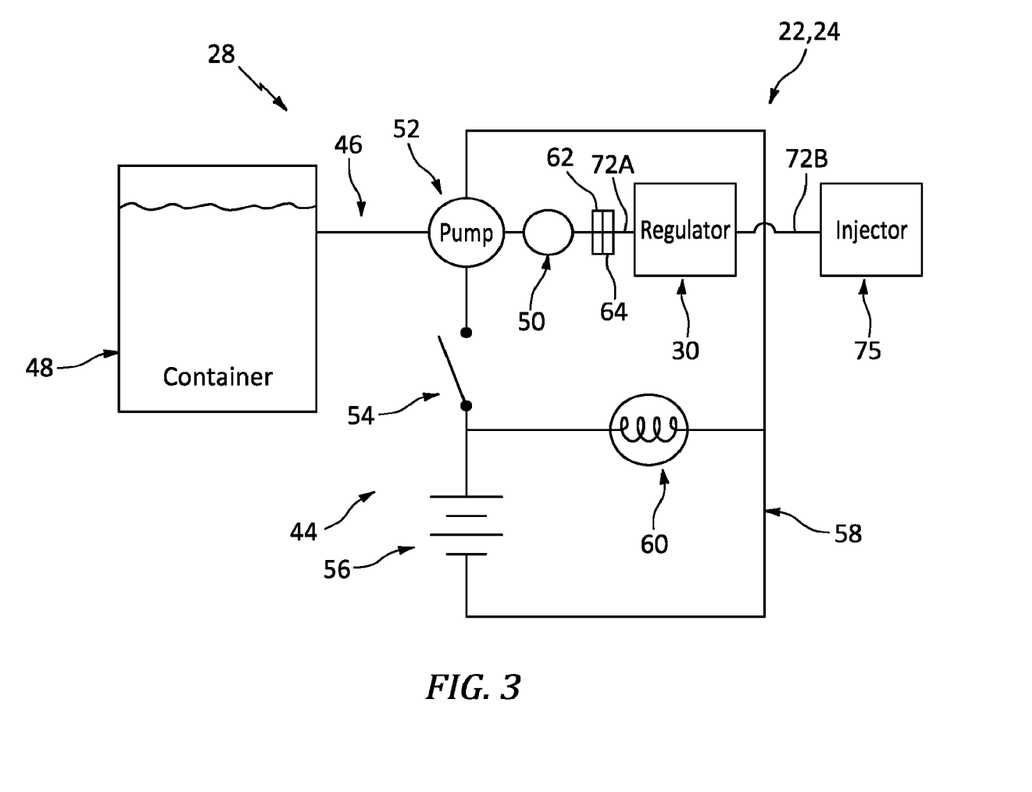
FIG. 3 is a schematic illustration of a fluid system for the treatment system in fluid communication with the fuel system.

Referring to FIG. 3, the fluid system 28 includes a preservation fluid pump system 44 and a preservation fluid removal flow circuit 46. The fluid system 28 may also include a preservation fluid container 48 and/or a pressure gauge 50.

The pump system 44 of FIG. 3 includes a preservation fluid removal pump 52, a pump system control element 54, a pump system power source 56 and a pump system wiring harness 58. The pump system 44 may also include a pump system indicator 60.

The pump 52 is configured to generate a suction force to draw the preservation fluid out of the fuel system 22. The pump 52, for example, may be configurable as a vacuum pump. The pump 52 of FIG. 3 is configured as an electrically driven pump. The pump 52 may be configured as a gear pump or a centrifugal pump. Of course, various types of pumps are known in the art, and the present disclosure is not limited to any particular types or configurations thereof.

The control element 54 may be configured as a switch. This switch may be a manually triggered switch; e.g., a switch triggered by an operator. The switch may alternatively be an electronically triggered switch; e.g., a switch triggered by or configured as part of the electronic controller. The fluid system control element 54 of FIG. 3 is configured discrete (e.g., separate) from the control system control element 32 of FIG. 2. However, in other embodiments, these two control elements 32 and 54 may be combined as a single control element.

The power source 56 of FIG. 3 is configured as a battery. This battery may be electrically coupled with the wiring harness 58 through one or more power inputs; e.g., positive and negative terminals. Alternatively, the power source 56 may be configured as an external power source such as, but not limited to, an electric generator or an electric power grid, where the control system pump system 44 may be electrically coupled to (e.g., plugged into) the external power source via, for example, a power input such as a cord. The fluid system power source 56 of FIG. 3 is configured discrete (e.g., separate) from the control system power source 34 of FIG. 2. However, in other embodiments, these two power sources 34 and 56 may be combined as a single power source.

The wiring harness 58 is configured to electrically couple the pump system elements 52, 54, 56 and 60 together.

The indicator 60 is configured to provide an indication when, for example, the pump 52 is operational; e.g., energized, turned on. The indicator 60, for example, may be configured to provide the indication when the control element 54 provides electrical power to the pump 52. The indication may be a visual indicator and/or an audible indication. The indicator 60, for example, may be configured as an indicator light. Of course, various other types of indicators are known in the art, and the present disclosure is not limited to any particular types or configurations thereof.

The flow circuit 46 is configured to fluidly couple the pump system 44 and its pump 52 to the preservation fluid container 48. The flow circuit 46 is also configured to fluidly couple the fluid system 28 to the turbine engine 24 and, more particularly, the fuel system 22. The flow circuit 46 of FIG. 3, for example, includes a circuit interface 62 (e.g., a port) configured to (e.g., removably, temporarily) mate with a fuel system interface 64 (e.g., a port) of the fuel system 22. For example, the circuit interface 62 may be a male fitting where the fuel system interface 64 is a receptacle. Alternatively, the circuit interface 62 may be a receptacle where the fuel system interface 64 is a male fitting. Of course, various types of fluid interfaces are known in the art, and the present disclosure is not limited to any particular types or configurations thereof.

The preservation fluid container 48 is configured to receive the preservation fluid removed (e.g., drawn out) from the fuel system 22 by the pump 52. The preservation fluid container 48 is also configured to at least temporarily store (e.g., contain, hold) the removed preservation fluid. The preservation fluid container 48 of FIG. 3, for example, may be configured as a tank, a pressure vessel or a bladder. Of course, various types of fluid containers are known in the art, and the present disclosure is not limited to any particular types or configurations thereof.

The pressure gauge 50 is configured to measure fluid pressure of the preservation fluid flowing through the flow circuit 46. In addition or alternatively, the pressure gauge 50 may be configured to measure vacuum suction being applied to the fuel system 22 by the pump 52.

Figure 4:
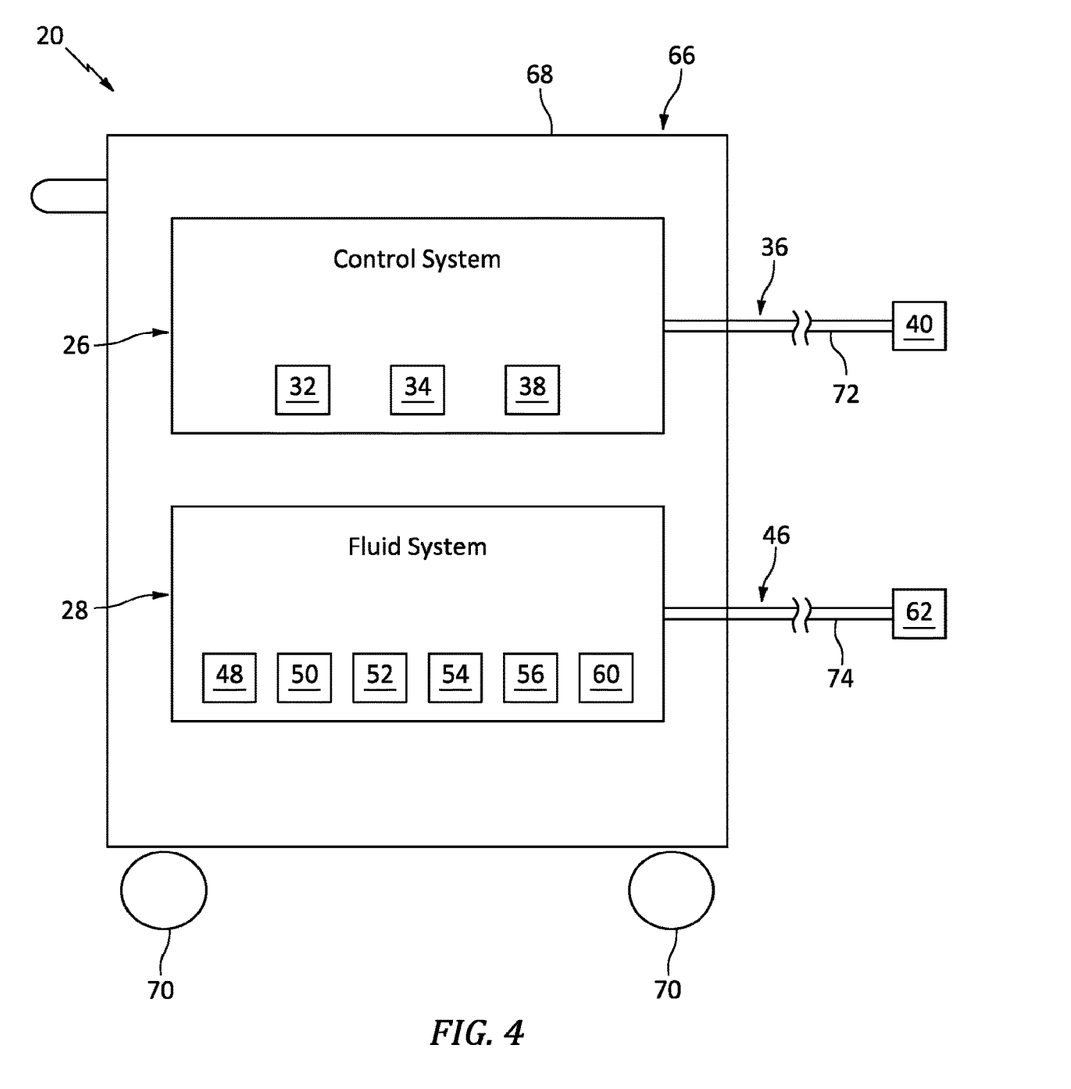
FIG. 4 is a schematic illustration of the treatment system configured as a mobile unit.

Referring to FIG. 4, the treatment system 20 may be configured as a mobile unit. The treatment system 20 of FIG. 4, for example, includes a mobile housing 66 such as, but not limited to, a push/pull cart. The mobile housing 66 of FIG. 4 includes a housing structure 68 and one or more wheels 70 (e.g., casters) mounted to a base of the housing structure 68. The control system 26 and/or the fluid system 28 is arranged within, on and/or otherwise with the housing structure 68. The control system 26 and/or fluid system 28 may also be mounted to the housing structure 68. One or more of the control system components (e.g., 32, 34 and/or 38) and/or one or more of the fluid system components (e.g., 48, 50, 52, 54, 56 and/or 60) of FIG. 4, for example, are supported by the housing structure 68. However, a portion 72 (e.g., a flexible electrical conduit) of the control system wiring harness 36 and/or a portion 74 (e.g., a flexible fluid conduit) of the flow circuit 46 may be configured outside of (e.g., and not support by) the housing structure 68 to facilitate mating with the turbine engine 24 (see FIG. 1).

Configuring the treatment system 20 as a mobile unit may facilitate treatment of the turbine engine 24 at various different locations. For example, a manufacturing facility may include various different assembly stations, where a respective turbine engine is located at each of those assembly stations. Rather than providing each assembly station with a dedicated treatment system, the mobile treatment system 20 may be moved (e.g., pushed or pulled by hand) from one assembly station to another assembly station as needed. Furthermore, the treatment system 20 may be removed from the assembly station to provide additional work room before and/or after turbine engine treatment.

Figure 5:
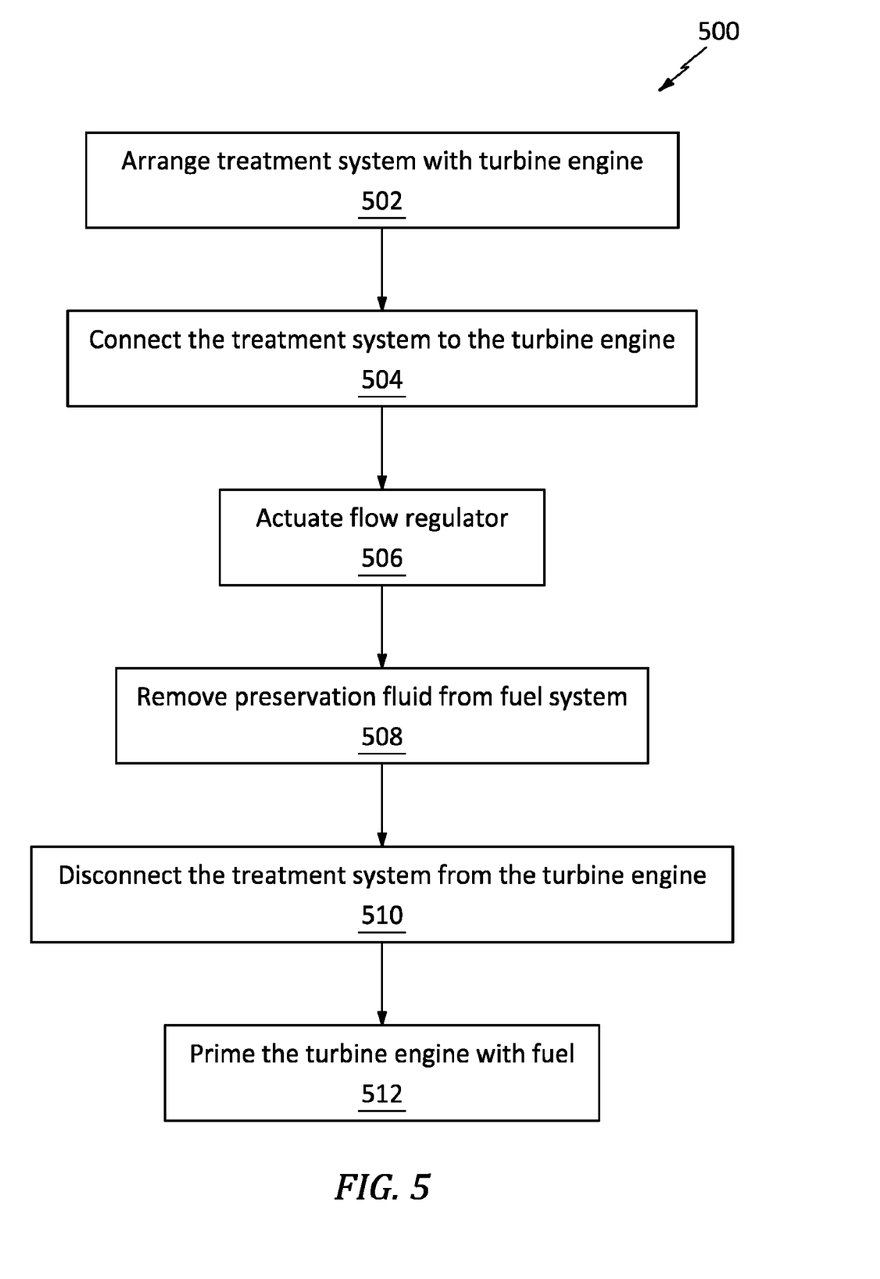
FIG. 5 is a flow diagram for treating the fuel system of the turbine engine using the treatment system.

FIG. 5 is a flow diagram of a method 500 for treating a turbine engine fuel system using a (e.g., mobile) treatment system. For ease of description, the treatment method 500 is described below with reference to the treatment system 20 and the turbine engine 24 of FIG. 1. The treatment method 500, however, is not limited thereto. For example, in other embodiments, the treatment method 500 may be performed using another treatment system and/or performed on another turbine engine.

In step 502, the treatment system 20 is arranged with the turbine engine 24. The treatment system 20, for example, may be moved (e.g., pushed or pulled by an individual) from a first location to a second location. At this second location, the treatment system 20 is positioned close to (e.g., adjacent or proximate) the turbine engine 24.

In step 504, the treatment system 20 is connected to the turbine engine 24. The harness interface 40, for example, may be mated with the fuel system interface 42. The control system 26 may thereby be electronically coupled with the fuel system 22, and in communication with the flow regulator 30. The circuit interface 62 may also or alternatively be mated with the fuel system interface 64. The fluid system 28 may thereby be fluidly coupled with the fuel system 22.

In step 506, the flow regulator 30 is actuated. The control element 32 of FIG. 2, for example, may provide a control signal (e.g., a predetermined electrical current) to the flow regulator 30. The flow regulator 30 may open in response to receiving the control signal. Referring to FIG. 1, this opening of the flow regulator 30 may fluidly couple a plurality of fuel system circuit segments 72A and 72B on fluidly opposing sides of the flow regulator 30. The opening of the flow regulator 30 thereby facilitates fluid flow through the open flow regulator 30 between the fuel system circuit segments 72A and 72B.

In step 508, the preservation fluid is removed from the fuel system 22. The control element 54 of FIG. 3, for example, may provide a control signal (e.g., a predetermined electrical current) to the pump 52. The pump 52 may turn on (e.g., energize) in response to receiving the control signal. When on, the pump 52 may generate a suction force within the flow circuit 46 between, for example, the pump 52 and the circuit interface 62. This suction force may draw (e.g., pull, suction or otherwise direct) the preservation fluid out of the fuel system 22 and into the fluid system 28. The suction force, for example, may draw the preservation fluid away from (e.g., and out of) at least one (or more) fuel injector 75 of the fuel system 22, through the open flow regulator 30, and into the fluid system 28. Under this suction force, a first direction of the flow of the preservation fluid within (e.g., out of) the fuel system 22 may be opposite a second direction of flow of fuel within (e.g., through) the fuel system 22 during normal turbine engine operation. The pump system 44 may thereby operate the fuel system 22 in reverse flow during the removal of the preservation fluid.

Once the preservation fluid is within the fluid system 28, the pump 52 directs (e.g., pumps) the preservation fluid to the preservation fluid container 48. The preservation fluid container 48 may store (e.g., contain) the preservation fluid for later disposal and/or reuse. It is worth noting, the step 508 may also remove remnants of old fuel that may have remained within the fuel system 22 following the preservation process. This old fuel may also be directed into and stored within the fluid container 48.

Depending upon the length of time the pump 52 is turned on, substantially (e.g., at least 80-90% or more) all or completely all of the preservation fluid may be removed from the turbine engine 24 and its fuel system 22 during the removal step 508. The treatment method 500 of the present disclosure, however, is not limited to such substantial or complete removal of the preservation fluid. For example, the pump 52 may be operated for a shorter period of time to remove a select portion of the preservation fluid from the turbine engine 24 and its fuel system 22.

The removal step 508 is described above as occurring after the actuation step 506. However, in other embodiments, the actuation step 506 and the removal step 508 may be performed concurrently; e.g., initiated simultaneously or otherwise overlapping.

In step 510, the treatment system 20 is disconnected from the turbine engine 24. The harness interface 40, for example, may be disconnected from the fuel system interface 42. The circuit interface 62 may also or alternatively be disconnected from the fuel system interface 64.

Figure 6:
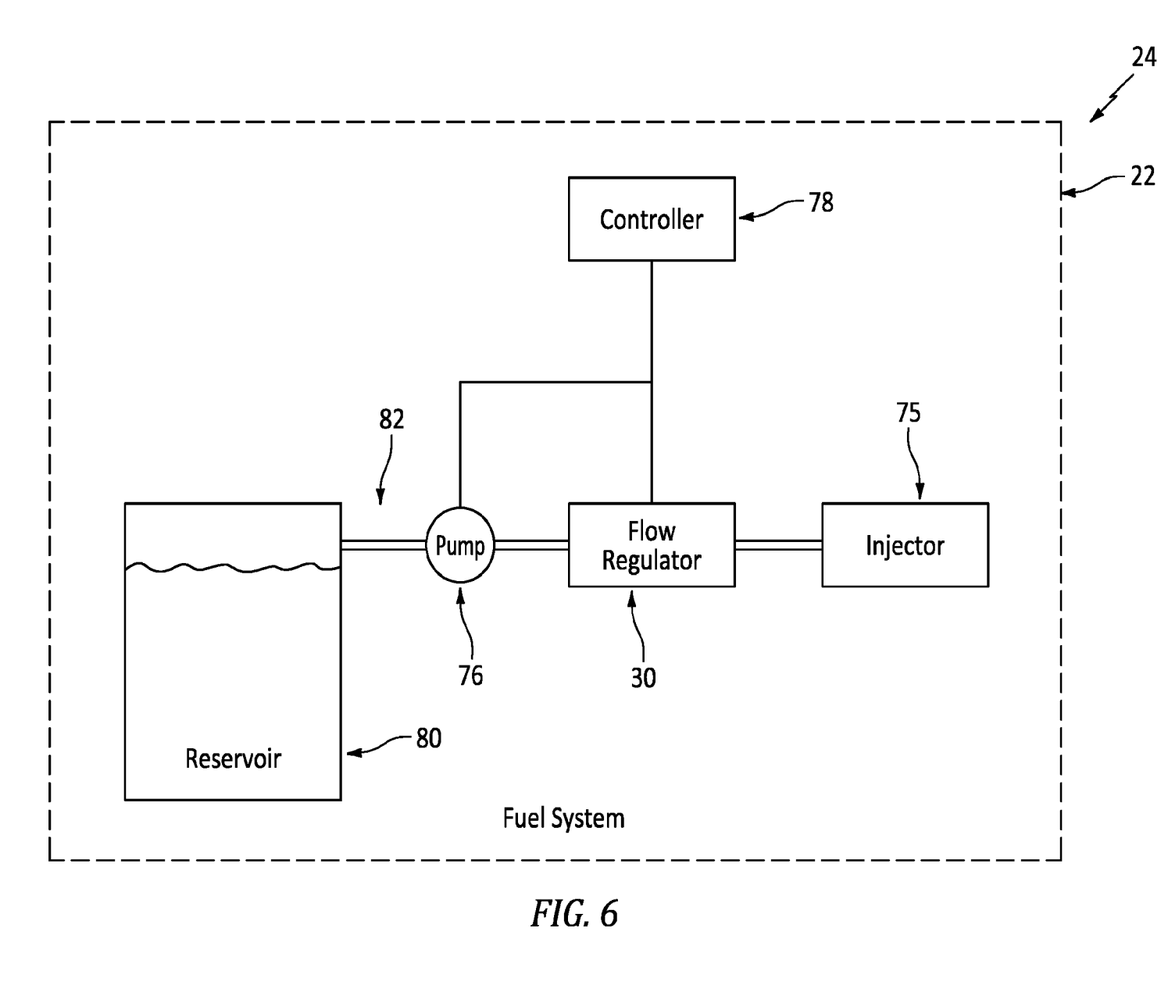
FIG. 6 is a schematic illustration of the fuel system.

In step 512, the turbine engine 24 is primed with fuel. For example, referring to FIG. 6, a fuel pump 76 of the fuel system 22 may be turn on (e.g., energize) in response to receiving a control signal from an onboard engine controller 78 (e.g., an electronic control unit (ECU), an electronic engine controller (EEC), etc.). The engine controller 78 may also send a signal to the flow regulator 30 to open. When the fuel pump 76 is on and the flow regulator 30 is open, fuel may be directed (e.g., pumped) from a fuel reservoir 80 (e.g., a fuel tank) through a fuel system circuit 82 to the injector 75. The fuel system 22 may thereby be operated to self-prime. Examples of the fuel include, but are not limited to, jet fuel, kerosene, JP4, JP5, JP8, JP10, Jet A, Jet B, NATO F24, TS-1, etc.

Following the priming, the turbine engine 24 may be started for normal operation. During the starting of the turbine engine 24, substantially all or completely all of the preservation fluid is already removed from the turbine engine 24 and its fuel system 22. The preservation fluid therefore does not interfere with turbine engine starting and/or operation. Performing the treatment method 500 before starting a turbine engine that was previously stored and/or transported with preservation fluid may thereby facilitate, for example, quicker and more environmentally friendly turbine engine start up as compared, for example, to pumping the preservation fluid through the injector during turbine engine start up.

Figure 7:
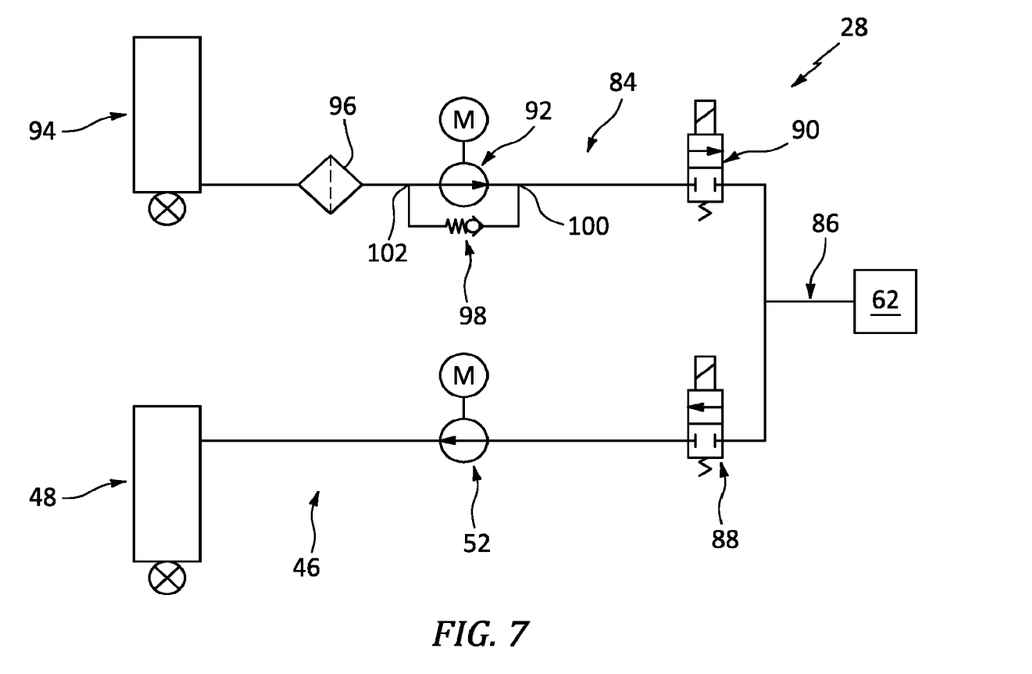
FIG. 7 is a schematic illustration of the fluid system configured with a fuel priming circuit.

In some embodiments, referring to FIG. 7, the fluid system 28 may also be configured to prime the fuel system 22 (see FIG. 1) following the removal of the preservation fluid, but before the disconnection step 510 (e.g., the steps 510 and 512 may be reversed). This priming may also serve to purge any remaining preservation fluid remnants out of the fuel system 22. The fluid system 28 of FIG. 7, for example, includes a fuel priming flow circuit 84 in addition to the preservation fluid removal flow circuit 46. These flow circuits 46 and 84 are fluidly coupled in parallel with the circuit interface 62 through a (e.g., common, shared) intermediate flow circuit 86.

Each of the flow circuits 46 and 84 is configured with a respective flow regulator 88, 90; e.g., solenoid valve. During a first (e.g., preservation fluid removal) mode of operation, the flow regulator 88 is configured to fluidly couple the preservation fluid removal flow circuit 46 with the intermediate flow circuit 86, and the flow regulator 90 is configured to fluidly decouple the fuel priming flow circuit 84 from the intermediate flow circuit 86. During a second (e.g., fuel priming) mode of operation, the flow regulator 88 is configured to fluidly decouple the preservation fluid removal flow circuit 46 from the intermediate flow circuit 86, and the flow regulator 90 is configured to fluidly couple the fuel priming flow circuit 84 with the intermediate flow circuit 86.

The fluid system 28 of FIG. 7 includes a fuel priming pump 92 and a fuel container 94. The fluid system 28 may also include a fuel filter 96 and/or a pressure relief flow regulator 98; e.g., a pressure relief valve. These fluid system components 92, 94, 96 and 98 are configured with and fluidly coupled together by the fuel priming flow circuit 84.

The priming pump 92 of FIG. 7 is configured as an electrically driven pump. The priming pump 92 may be configured as a gear pump or a centrifugal pump. Of course, various types of pumps are known in the art, and the present disclosure is not limited to any particular types or configurations thereof. The priming pump 92 of FIG. 7 may be actuated in a similar manner as the pump 52; e.g., see control element 54 in FIG. 3.

The fuel container 94 is configured to at least temporarily store (e.g., contain, hold) the fuel. The fuel container 94 of FIG. 7, for example, may be configured as a tank, a pressure vessel or a bladder. Of course, various types of fuel containers are known in the art, and the present disclosure is not limited to any particular types or configurations thereof.

The pressure relief flow regulator 98 is configured to regulate pressure of the fuel directed out of the fuel priming flow circuit 84 through the flow regulator 90. The pressure relief flow regulator 98 of FIG. 7 includes an inlet 100 and an outlet 102. The inlet 100 is fluidly coupled to and inline between the priming pump 92 and the flow regulator 90. The outlet 102 is fluidly coupled to and inline between the priming pump 92 and the fuel filter 96.

During the first mode of operation, the flow regulator 88 is opened and the flow regulator 90 is closed. The fluid system 28 may be operated as described above to remove the preservation fluid from the turbine engine 24 and its fuel system 22.

During the second mode of operation, the flow regulator 88 is closed and the flow regulator 90 is opened. The priming pump 92 is turned on (e.g., energized) and directs (e.g., pumps) fuel contained in the fuel container 94 through the flow circuits 84 and 86 and into the fuel system 22 (see FIG. 1). During this second mode of operation, the control system 26 may signal the flow regulator 30 to open such that the fuel may flow towards (e.g., to and/or into) the fuel injector 75. The treatment system 20 may thereby prime the fuel system 22 of the turbine engine 24 following removal of the preservation fluid.

Figure 8:
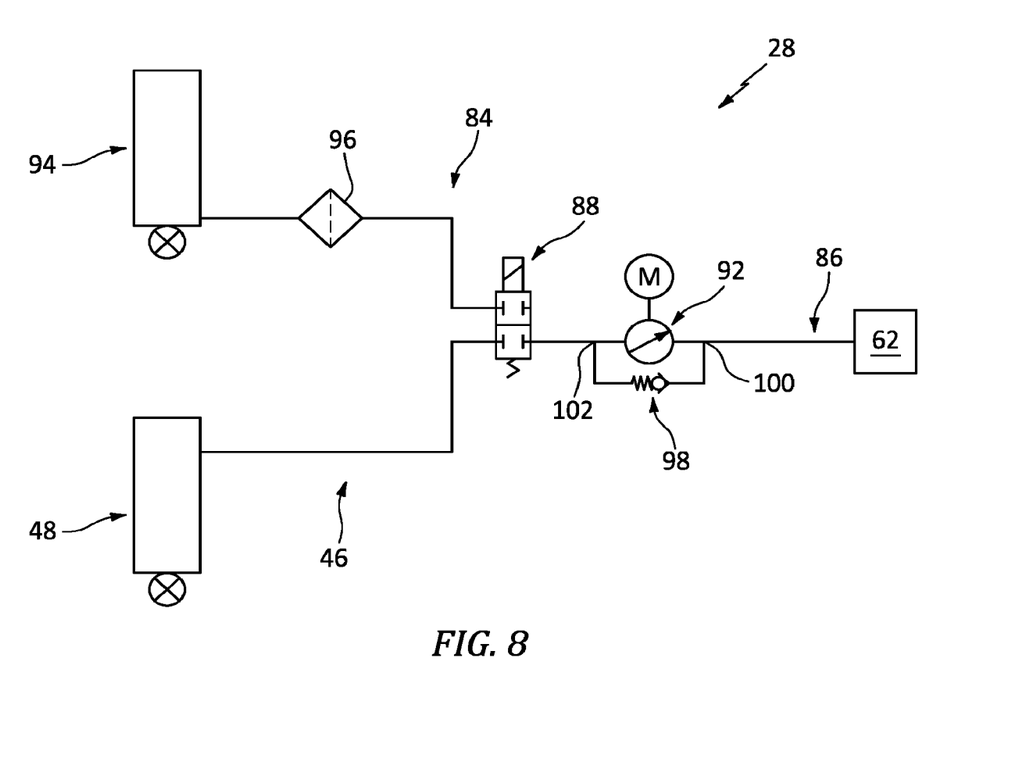
FIG. 8 is a schematic illustration of the fluid system configured with another fuel priming circuit.

In some embodiments, referring to FIG. 8, the priming pump 92 may be omitted, and the pump 52 may be configured as a priming/removal pump. The flow regulator 90 may also be omitted, and the flow regulator 88 may be configured as a common, shared flow regulator; e.g., a three way valve.

The pump 52 of FIG. 8 is fluidly coupled in parallel with both the preservation fluid container 48 and the fuel container 94 through the flow regulator 88. During the first mode of operation, the flow regulator 88 is configured to fluidly couple the preservation fluid container 48 with the intermediate flow circuit 86, and to fluid decouple the fuel container 94 from the intermediate flow circuit 86. During the second mode of operation, the flow regulator 88 is configured to fluidly decouple the preservation fluid container 48 from the intermediate flow circuit 86, and to fluid couple the fuel container 94 with the intermediate flow circuit 86.

In some embodiments, referring to FIGS. 1, 7 and 8, the fluid system 28 may also be configured to charge the fuel system 22 of the turbine engine 24 with the preservation fluid. The removal processes described above, for example, may be run in reverse in order to direct any preservation fluid contained, for example, within the preservation fluid container 48 (or another container) into the fuel system 22. Alternatively, the priming system may be used to charge the fuel system 22 with the preservation fluid rather than prime the fuel system 22 with the fuel. Still alternatively, the fluid system 28 may be configured with another flow circuit (e.g., similar to the fuel priming flow circuit 84) dedicated to charging the fuel system 22 with the preservation fluid.

In some embodiments, the fluid system 28 may be configured without the pump 52 (see FIG. 3). In such embodiments, the treatment system 20 may be configured to temporally power and/or control the fuel pump 76 (see FIG. 6) of the fuel system 22 for the preservation fluid removal.

Figure 9:
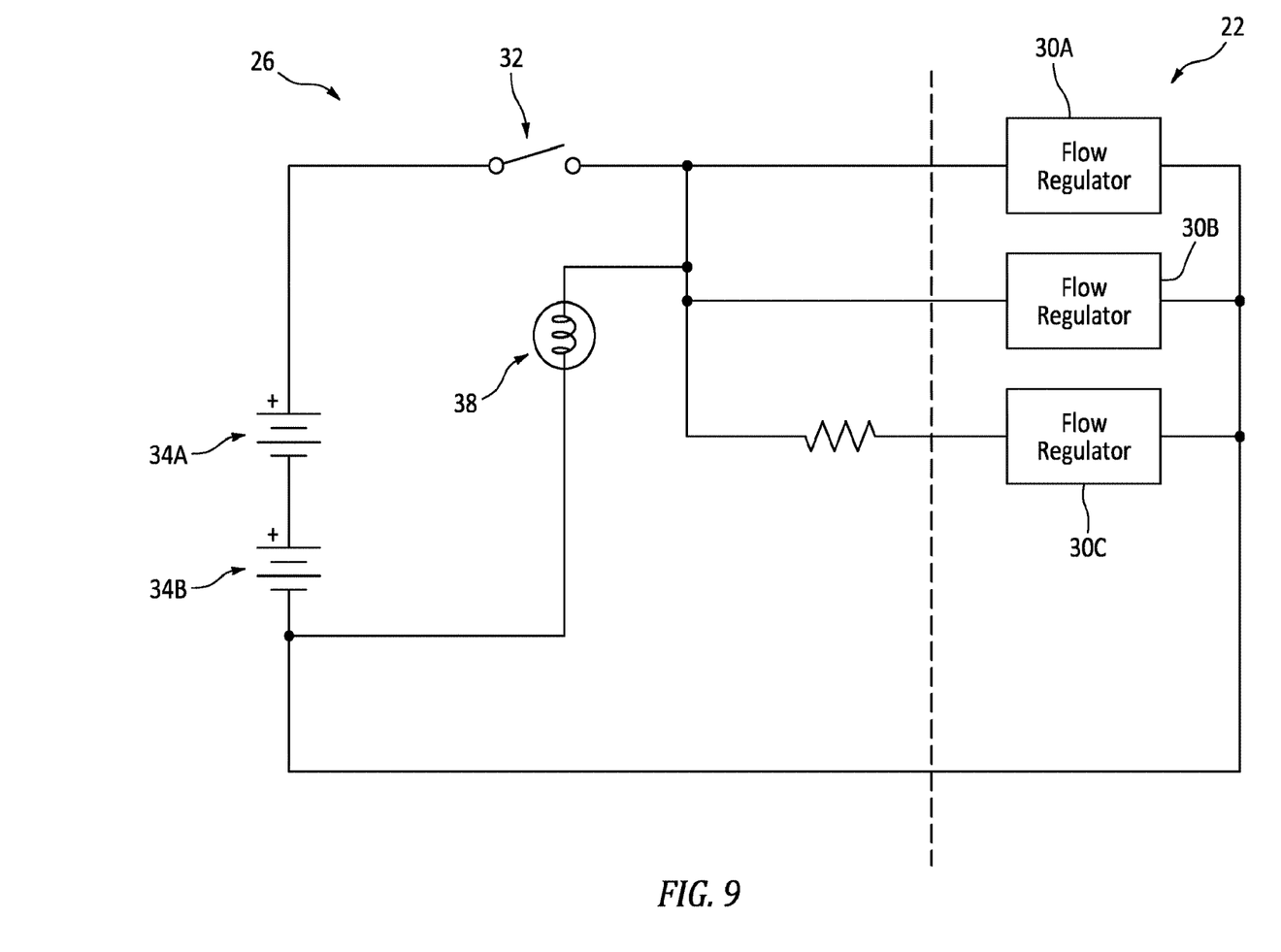
FIG. 9 is a schematic illustration of the control system configured in signal communication with a fuel system with multiple flow regulators.

In some embodiments, referring to FIG. 9, the control system 26 may be configured to communicate with and control a plurality of flow regulators 30A-C (generally referred to as "30") of the fuel system 22. The flow regulator 30A may be configured as or otherwise include a main solenoid valve. The flow regulator 30B may be configured as or otherwise include a start solenoid valve. The flow regulator 30C may be configured as or otherwise include a fuel servo valve. The present disclosure, however, is not limited to the foregoing exemplary combination of flow regulators 30.

In some embodiments, the control system 26 may be configured with multiple power sources 34A and 34B (generally referred to as "34"). One or more of these power sources 34 may each be an internal power source such as, but not limited to, a battery. In addition or alternatively, one or more of the power sources 34 may each be an external power source such as, but not limited to, an electric generator or an electric power grid.

In some embodiments, the control system 26 may be configured independent of (e.g., discrete from) the fluid system 28 and the housing structure 68.

Figure 10:
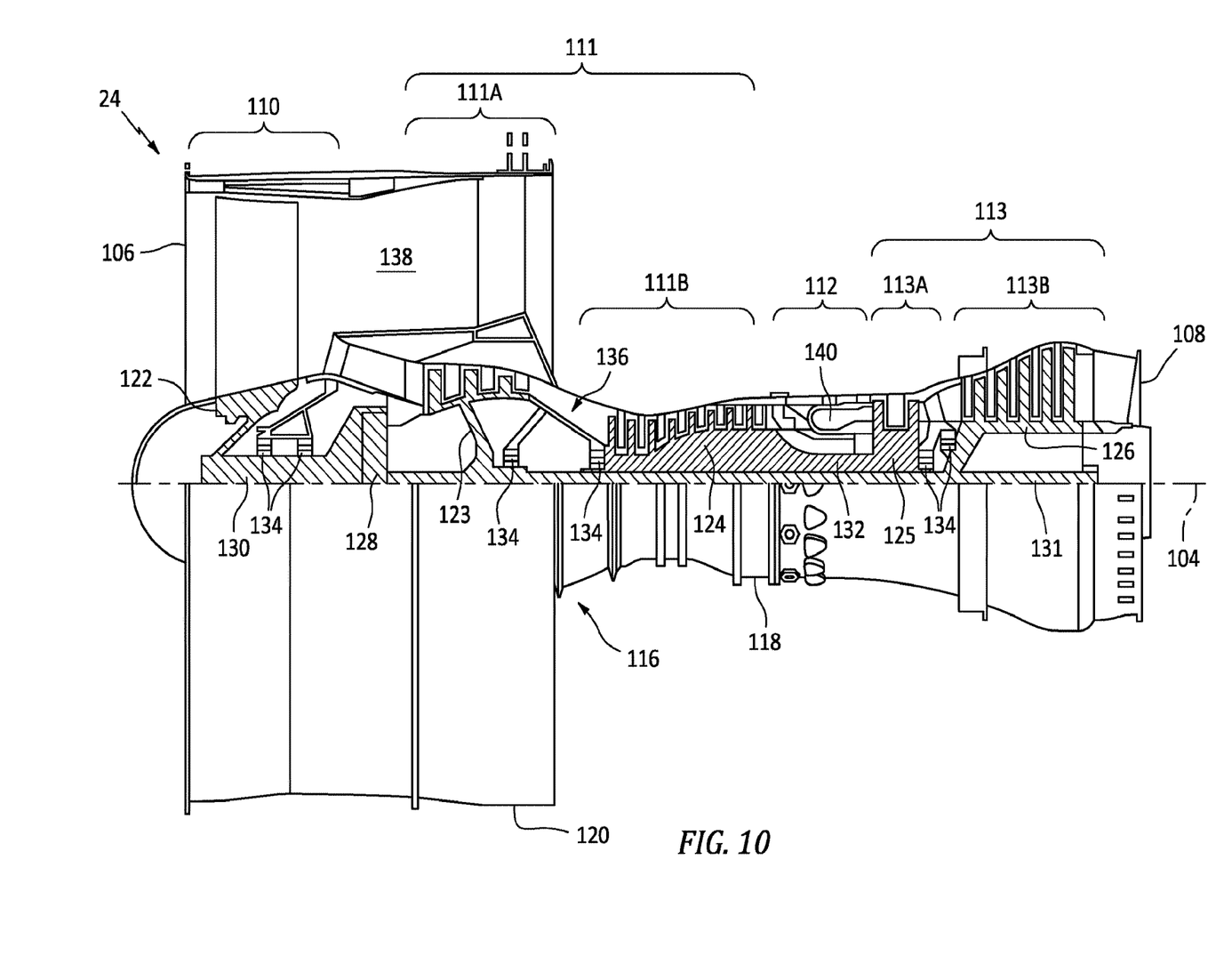
FIG. 10 is a side sectional illustration of an embodiment of the turbine engine.

FIG. 10 is a side cutaway illustration of the turbine engine 24 configured as a geared turbine engine. This turbine engine 24 extends along an axial centerline 104 between an upstream airflow inlet 106 and a downstream airflow exhaust 108. The turbine engine 24 includes a fan section 110, a compressor section 111, a combustor section 112 and a turbine section 113. The compressor section 111 includes a low pressure compressor (LPC) section 111A and a high pressure compressor (HPC) section 111B. The turbine section 113 includes a high pressure turbine (HPT) section 113A and a low pressure turbine (LPT) section 113B.

The engine sections 110-113B are arranged sequentially along the centerline 104 within an engine housing 116. This engine housing 116 includes an inner case 118 (e.g., a core case) and an outer case 120 (e.g., a fan case). The inner case 118 may house one or more of the engine sections 111A-113B; e.g., an engine core. The outer case 120 may house at least the fan section 110.

Each of the engine sections 110, 111A, 111B, 113A and 113B includes a respective rotor 122-126. Each of these rotors 122-126 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 122 is connected to a gear train 128, for example, through a fan shaft 130. The gear train 128 and the LPC rotor 123 are connected to and driven by the LPT rotor 126 through a low speed shaft 131. The HPC rotor 124 is connected to and driven by the HPT rotor 125 through a high speed shaft 132. The shafts 130-132 are rotatably supported by a plurality of bearings 134; e.g., rolling element and/or thrust bearings. Each of these bearings 134 is connected to the engine housing 116 by at least one stationary structure such as, for example, an annular support strut.

During turbine engine operation, air enters the turbine engine 24 through the airflow inlet 106. This air is directed through the fan section 110 and into a core flowpath 136 and a bypass flowpath 138. The core flowpath 136 extends sequentially through the engine sections 111A-113B. The air within the core flowpath 136 may be referred to as "core air". The bypass flowpath 138 extends through a bypass duct, which bypasses the engine core. The air within the bypass flowpath 138 may be referred to as "bypass air".

The core air is compressed by the compressor rotors 123 and 124 and directed into a combustion chamber 140 of a combustor in the combustor section 112. Fuel is injected via one or more of the fuel injectors 75 (see FIG. 6) into the combustion chamber 140 and mixed with the compressed core air to provide a fuel-air mixture. This fuel air mixture is ignited and combustion products thereof flow through and sequentially cause the turbine rotors 125 and 126 to rotate.

The rotation of the turbine rotors 125 and 126 respectively drive rotation of the compressor rotors 124 and 123 and, thus, compression of the air received from a core airflow inlet. The rotation of the turbine rotor 126 also drives rotation of the fan rotor 122, which propels bypass air through and out of the bypass flowpath 138. The propulsion of the bypass air may account for a majority of thrust generated by the turbine engine 24, e.g., more than seventy-five percent (75%) of engine thrust. The turbine engine 24 of the present disclosure, however, is not limited to the foregoing exemplary thrust ratio.

The treatment system 20 may be configured for use with various turbine engines other than the one described above. The treatment system 20, for example, may be configured for use with a geared turbine engine where a gear train connects one or more shafts to one or more rotors in a fan section, a compressor section and/or any other engine section. Alternatively, the treatment system 20 may be configured for use with a turbine engine configured without a gear train. The turbine engine may be configured as a turbofan engine, a turbojet engine, a turboprop engine, a turboshaft engine, a propfan engine, a pusher fan engine, an auxiliary power unit or any other type of turbine engine. The present disclosure therefore is not limited to any particular types or configurations of turbine engines. In addition, while the turbine engine is described above for use in an aircraft application, the present disclosure is not limited to such aircraft applications. For example, the turbine engine may alternatively be configured as an industrial gas turbine engine, for example, for a land based power plant.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A treatment system for a fuel system of a turbine engine, the fuel system including an injector, a fuel system interface and a flow regulator fluidly coupled between the injector and the fuel system interface, the treatment system comprising:
   a control system configured to signal the flow regulator to open; and
   a fluid system including a fluid system interface and a pump fluidly coupled with the fluid system interface, the fluid system interface configured to fluidly couple with the fuel system interface, and the pump configured to draw fluid out from the fuel system at the injector through the flow regulator;
   wherein the pump is a first pump, and the fluid is preservation fluid; and
   wherein the fluid system further includes a second pump configured to prime the fuel system with fuel after the preservation fluid is drawn out of the fuel system by the first pump.

2. The treatment system of claim 1, further comprising:
   a mobile housing;
   at least one of the control system or the fluid system arranged with and mounted to the mobile housing.

3. The treatment system of claim 1, wherein
   the control system includes a wiring harness with a power input;
   the control system is configured to selectively direct electrical current from power input to the flow regulator through the wiring harness.

4. The treatment system of claim 3, wherein the power input is configured to electrically couple the control system with an outside power source.

5. The treatment system of claim 3, further comprising:
   a battery; and
   the power input configured to electrically couple the control system to the battery.

6. The treatment system of claim 1, wherein the fluid system further includes a container configured to receive the fluid drawn out from the fuel system by the pump.

7. The treatment system of claim 1, wherein the pump is configured to draw the fluid out of the injector through the flow regulator.

8. The treatment system of claim 1, wherein the pump is configured to draw the fluid out of the injector through the flow regulator independent of startup of the turbine engine.

9. A treatment system for a fuel system of a turbine engine, the fuel system including a fuel system interface, the treatment system comprising:
   a fluid system including a fluid system interface, a pump and a container;
   the fluid system interface configured to fluidly couple with the fuel system interface;
   the pump fluidly coupled to and between the fluid system interface and the container, and the pump configured to draw preservation fluid out from the fuel system; and
   the container configured to receive the preservation fluid drawn out of the fuel system by the pump;
   wherein the pump is a first pump, and the fluid system further includes a second pump configured to prime the fuel system with fuel after the preservation fluid is drawn out of the fuel system by the first pump.

10. The treatment system of claim 9, further comprising:
    a mobile housing;
    the fluid system arranged with and mounted to the mobile housing.

11. The treatment system of claim 9, wherein the pump is configured to draw the preservation fluid out of a fuel injector of the fuel system.

12. The treatment system of claim 9, further comprising a control system configured to signal a flow regulator of the fuel system to open.

13. The treatment system of claim 12, wherein
    the control system includes a wiring harness with a power input;
    the control system is configured to selectively direct electrical current from power input to the flow regulator through the wiring harness.

14. The treatment system of claim 13, wherein the power input is configured to electrically couple the control system with an outside power source.

15. The treatment system of claim 13, further comprising:
    a battery; and
    the power input configured to electrically couple the control system to the battery.

16. A treatment system for a fuel system of a turbine engine, the fuel system including a fuel system interface, the treatment system comprising:
    a fluid system including a fluid system interface, a pump and a container;
    the fluid system interface configured to fluidly couple with the fuel system interface;

the pump fluidly coupled to and between the fluid system interface and the container, and the pump configured to draw preservation fluid out from the fuel system; and the container configured to receive the preservation fluid drawn out of the fuel system by the pump;

wherein the pump is configured to draw the preservation fluid out of a fuel injector of the fuel system the fluid system interface;

wherein the pump is a first pump; and wherein the fluid system further includes a second pump configured to prime the fuel system with fuel after the preservation fluid is drawn out of the fuel system by the first pump.

\* \* \* \* \*